United States Patent [19]

Takashima

[11] Patent Number: 5,483,376
[45] Date of Patent: Jan. 9, 1996

[54] OPTICAL APPARATUS

[75] Inventor: Tsuneo Takashima, Kawasaki, Japan

[73] Assignee: Canon Kabushiki Kaisha, Tokyo, Japan

[21] Appl. No.: 373,504

[22] Filed: Jan. 17, 1995

Related U.S. Application Data

[63] Continuation of Ser. No. 270,793, Jul. 5, 1994, abandoned, which is a continuation of Ser. No. 982,508, Nov. 27, 1992, abandoned.

[30] Foreign Application Priority Data

Nov. 29, 1991 [JP] Japan ..................................... 3-339363

[51] Int. Cl.$^6$ .................................................. G02B 27/64
[52] U.S. Cl. ............................................ 359/554; 359/557
[58] Field of Search ...................................... 359/554, 557

[56] References Cited

U.S. PATENT DOCUMENTS

5,107,293  4/1992  Sekine et al. ............................. 359/554

*Primary Examiner*—Scott J. Sugarman
*Attorney, Agent, or Firm*—Fitzpatrick, Cella, Harper & Scinto

[57] ABSTRACT

An optical apparatus comprising blur suppressing devices for suppressing blurs in a plurality of directions, a controlling device for conducting a drive control of the blur suppressing devices for suppressing the blurs in the plurality of directions, and a drive control switching device for switching in time division the drive control conducted by the control device to suppress the blurs in the plurality of directions. The vibrations in a plurality of directions may be pitching and yawing of the apparatus. The optical apparatus may further comprises drive devices for driving the respective blur suppressing devices, and vibration detecting devices for detecting the respective vibrations in a plurality of directions.

42 Claims, 3 Drawing Sheets

OPTICAL APPARATUS

This application is a continuation of prior application Ser. No. 08/270,793 filed on Jul. 5, 1994, which is a continuation of prior application Ser. No. 07/982,508 filed on Nov. 27, 1992, both now abandoned.

BACKGROUND OF THE INVENTION

1. Field of the Invention

The present invention relates to an optical apparatus having blur suppressing means to suppress an image blur caused by vibrations given thereon.

2. Related Background Art

Automatization is recently remarkable for photo-taking apparatuses such as still cameras and video cameras, so that cameras with automatic exposure and/or automatic focus adjusting mechanism are widely under practical use. Further, there are some practical techniques to provide a camera with a blur suppression or image stabilization function to suppress the image blur caused by vibrations of the entire apparatus.

An apparatus having such an image stabilizing function usually has at least vibration detecting means for detecting vibrations of the entire apparatus, blur suppressing means for suppressing the image blur caused by the vibrations, driving means for driving the blur suppressing means, and controlling means for calculating an amount of blur suppression in accordance with an output of the vibration detecting means to control the driving means.

The above vibration detecting means and driving means are generally comprised of a pitching detection system and a pitching drive system to conduct detection and suppression drive to vibrations in the pitching direction (which is a rotation direction about the horizontal axis), and of a yawing detection system and a yawing drive system to conduct detection and suppression drive to vibrations in the yawing direction (which is a rotation direction about the vertical axis), respectively. The above controlling means is comprised of a pitching control system to control a pitching drive operation to conduct a pitching suppression operation of the blur suppressing means in accordance with the detection signal of the pitching detection system and of a yawing control system to control a yawing drive operation to conduct a yawing suppression operation of the blur suppressing means in accordance with the detection signal of the yawing detecting means.

A device such as an angular acceleration meter, an angular velocity meter, and an angular displacement meter is employed as the above-mentioned vibration detecting means, and an element such as a variable apex angle prism is employed as the above-mentioned blur suppressing means.

The conventional image stabilizing apparatus as described, however, requires a set of control means for the exclusive use of each system to carry out either of the suppression operations about the corresponding axis, as apparent from the above description, which results in increase in the number of circuits and increase in production cost.

SUMMARY OF THE INVENTION

In one aspect of the present invention, an optical apparatus comprises blur suppressing means for optically conducting a blur suppression, control means for controlling a drive of the blur suppressing means, and drive control switching means for switching the drive control of the controlling means in time division, whereby a single set of control means can control a plurality of control systems identical in function and operation, enabling to decrease the number of circuits and to decrease the production cost thereof.

DETAILED DESCRIPTION OF THE PREFERRED EMBODIMENTS

The present invention will be explained in detail in the following based on the preferred embodiments as illustrated in the accompanying drawings.

Figure 1:
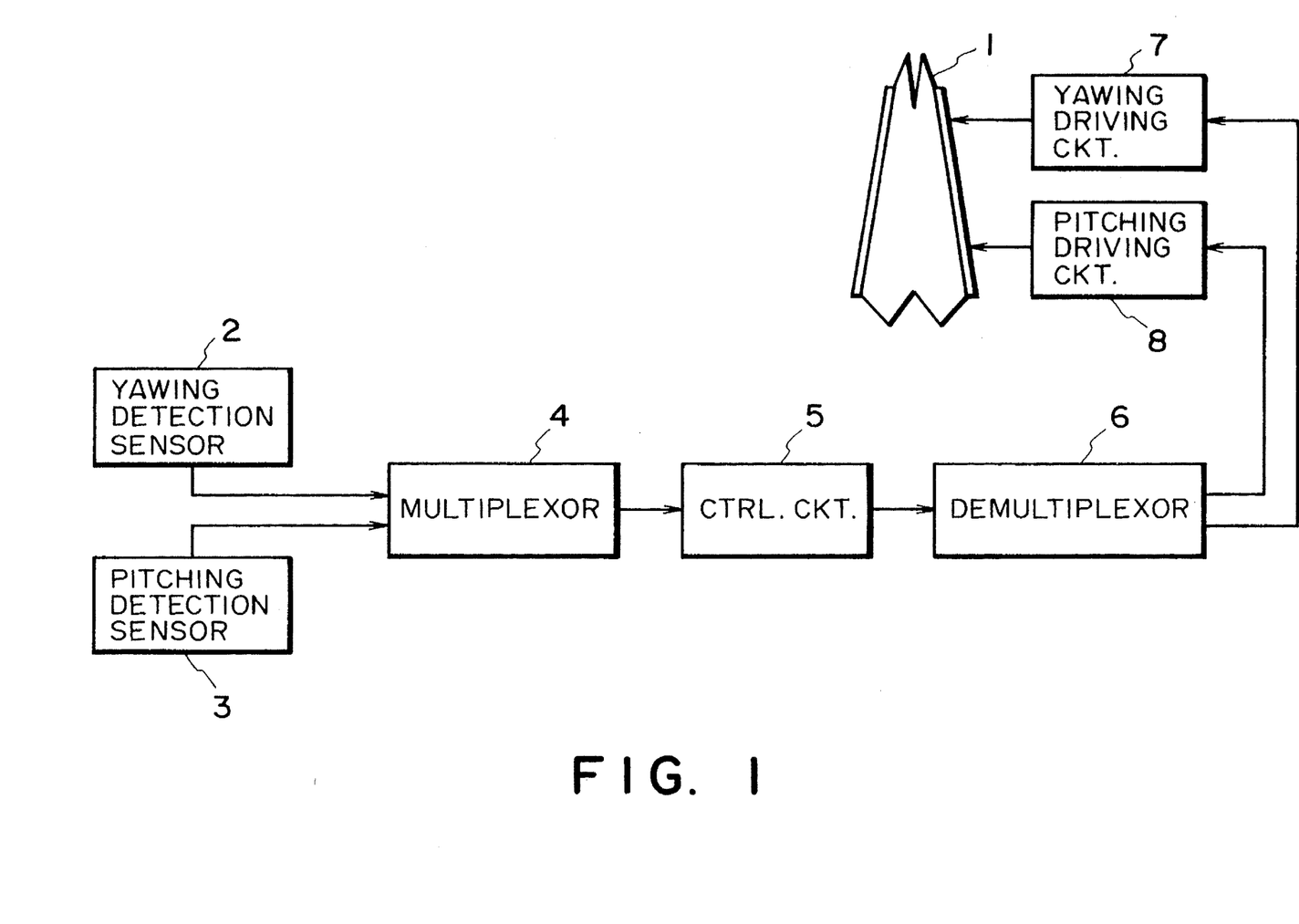
FIG. 1 is a circuit block diagram to show a construction of an image stabilizing apparatus in the first embodiment of the present invention.

FIG. 1 is a circuit block diagram to show a construction of an image stabilizing apparatus in the first embodiment of the present invention.

In FIG. 1, reference numeral 1 designates a variable apex angle prism, which comprises two opposing transparent plates, a transparent film of bellows, which can expand and contract, for sealing the periphery of the plates, and a liquid with a high index of refraction encapsulated in a space sealed thereby. The two opposing transparent plates are supported rotatably about a pitching axis and a yawing axis thereof, and is fixed in front of a photo-taking lens, so that they may change an optical axis thereof in any direction.

Numerals 2 and 3 respectively denote a yawing detection sensor and a pitching detection sensor, which detect deviation amounts about the yawing axis and about the pitching axis, respectively, and convert them into output voltages. Numeral 4 represents a multiplexor, which transmits the output voltages of the detection sensors 2 and 3 to a control circuit 5 as detailed below while switching them one to another.

Numeral 5 denotes a control circuit, which comprises a switch timing generator, an amplifier, and a phase compensator. The control circuit 5 controls the switching operation in tile aforementioned multiplexor 4 and that in a below-described demultiplexor 6, and conducts a blur suppression control in time division about the yawing axis and about the pitching axis.

Numeral 6 is a demultiplexor, which carries out the switching operation when a blur suppression control signal is transmitted to either of a pitching driving circuit 8 and a yawing driving circuit 7 as described below under a command from the control circuit 5. Numerals 7 and 8 respectively designate the yawing driving circuit and the pitching driving circuit, each of which comprises a current amplifier to convert the drive signal into an electric current and an actuator to rotate the variable apex angle prism 1 by a certain angle by an electromagnetic force.

An operation of the apparatus with the above construction is explained in order in the following.

Suppose that the entire apparatus is vibrated due to vibrations of a hand holding the photo-taking apparatus. The yawing detection sensor 2 and the pitching detection sensor 3 detect a yawing component and a pitching component of the vibrations.

The timing generator in the control circuit 5 controls the multiplexor 4 to carry out alternate switching between transmission lines connecting either of the outputs of the yawing and pitching detection sensors 2, 3 to the control circuit 5 at predetermined intervals. The amplifier and the phase compensator in the control circuit 5 multiply the respective output signals of the detection sensors 2, 3 by respective appropriate factors to generate drive voltages necessary for removal of the respective vibrations while effecting proper phase compensation thereon to maintain a good control condition.

The demultiplexor 6 carries out alternate switching at predetermined intervals between transmission lines connecting the output of the control circuit 5, which is a drive voltage, to either of the yawing and pitching driving circuits 7, 8 under control of the above-described switch timing generator. This switching operation is synchronized with the switching timing of the multiplexor 4, so that the yawing detection sensor 2, the control circuit 5, and the yawing driving circuit 7 are electrically connected in one moment, while the pitching detection sensor 3, the control circuit 5, and tile pitching driving circuit 8 are electrically connected in another moment after a certain time has elapsed.

The current amplifiers in the yawing driving circuit 7 and the pitching driving circuit 8 amplify the drive voltages output from tile control means 5 up to certain electric current values, and supply the amplified currents to the actuators. The actuators generate drive forces according to the supplied currents to rotate the variable apex angle prism 1 by a certain apex angle. By this operation, the variable apex angle prism 1 may refract an optical flux to suppress the image blur of photographic image caused for example by hand vibrations.

Incidentally, it is not rare that the pitching amount is relatively greater than the yawing amount.

For example, if a photographer is taking a photo while walking, an arm itself of the photographer tends to vibrate greatly in the vertical direction. In that case, the vibration amount of tile photo-taking apparatus is in general greater in the pitching direction than in the yawing direction. Also, if a photographer is taking a photo in a moving object such as a car, the photo-taking apparatus tends to pick up vertical vibrations of the moving object increasing the pitching amount in general.

Considering these circumstances, the time intervals of the switching signals generated by the switch timing generator in the control circuit 5 may be adjusted at a preliminarily defined ratio to lengthen tile control time for pitching and to shorten the control time for yawing, whereby the image stabilization property in the pitching direction may be enhanced as compared to that in the yawing direction. This in turn improves the image stabilizing capability of the entire apparatus.

In the first embodiment as arranged as described, the single control circuit 5 is effective to suppress the image blur caused by vibrations of the photo-taking apparatus such as hand vibrations in all directions so as to obtain an excellent photographic image without blur, and, further, with provision of the difference between the pitching control time and the yawing control time, the blur suppression can be carried out according to an actual vibration amount, whereby the total image stabilization effect may be enhanced.

Figure 2:
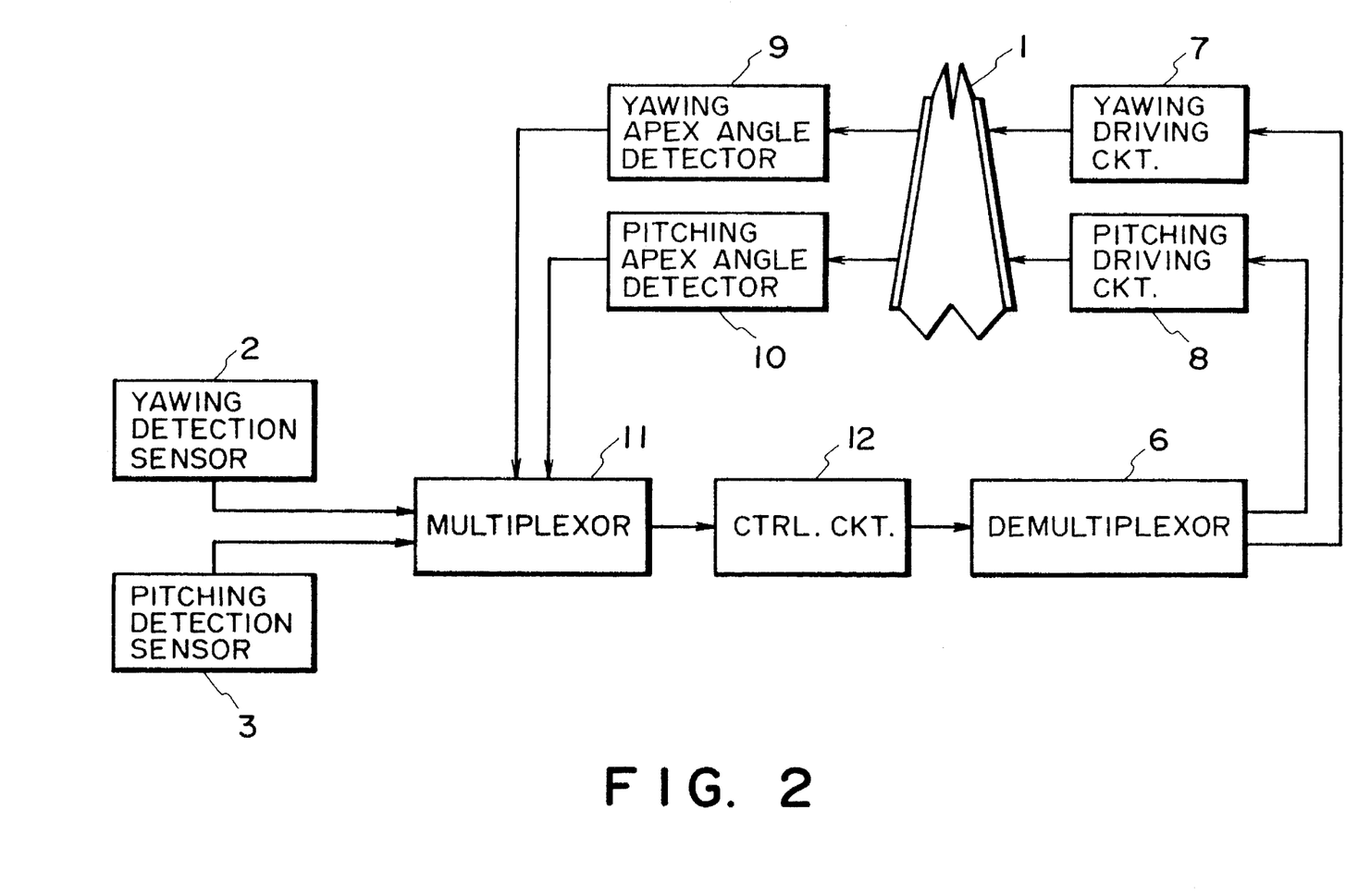
FIG. 2 is a circuit block diagram to show a construction of an image stabilizing apparatus in the second embodiment of the present invention.

FIG. 2 is a circuit block diagram to show a construction of an image stabilizing apparatus in the second embodiment of the present invention. The same elements are given the same numerals as in FIG. 1.

In FIG. 2, numerals 9 and 10 designate apex angle detection sensors to detect respective apex angles about the pitching and yawing axes of the variable apex angle prism 1 and to convert them to voltages at a certain ratio determined by an index of refraction of the internal fluid in the variable apex angle prism 1. Numeral 11 denotes a multiplexor, which conducts switching of transmission lines transmitting four outputs of the detection sensors 2, 3 and the apex angle detection sensors 9, 10 to a control circuit 12 at certain intervals through a command signal of the timing generator in the control circuit 12. Numeral 12 is the control circuit, which comprises a switch timing generator, a voltage value holder, a subtractor, an amplifier, and a phase compensator.

An operation of the apparatus with the above construction is next explained in order focusing on the difference from the aforementioned first embodiment.

The multiplexor 11 sequentially switches the transmission lines to connect the output of the yawing detection sensor 2, that of the yawing apex angle detection sensor 9, that of the pitching detection sensor 3, and that of the pitching apex angle detection sensor 10 in the named order to the control circuit 12.

When the output of the yawing detection sensor 2 or the pitching detection sensor 3 is connected to the control circuit 12, the voltage value holder in the control circuit 12 holds a voltage value thereof before a next timing. Then, when the apex angle detection sensor 9 or the apex angle detection sensor 10 is connected to the control circuit 12, the subtractor in the control circuit 12, outputs a difference between the output of the detection sensor 2, 3 held by the voltage holder and the output of the apex angle detection sensor 9, 10. The amplifier and the phase compensator in the control circuit 12 multiply the output signal of the subtractor by an appropriate factor for loop gain to generate a drive voltage necessary for canceling the difference in the variable apex angle prism 1 while effecting proper phase compensation to maintain a good control condition of the variable apex angle prism 1.

In other words, in the second embodiment, the control circuit 12 conducts the blur suppression operation in time division through a feedback control, in which a reference signal is the output of each of the yawing and pitching detection sensors 2, 3 and a feedback signal is the output of each of the apex angle detection sensors 9, 10.

Also in the present embodiment, the control time for pitching may be differed from that for yawing similarly as in the first embodiment, whereby the total image stabilization effect may be improved.

Figure 3:
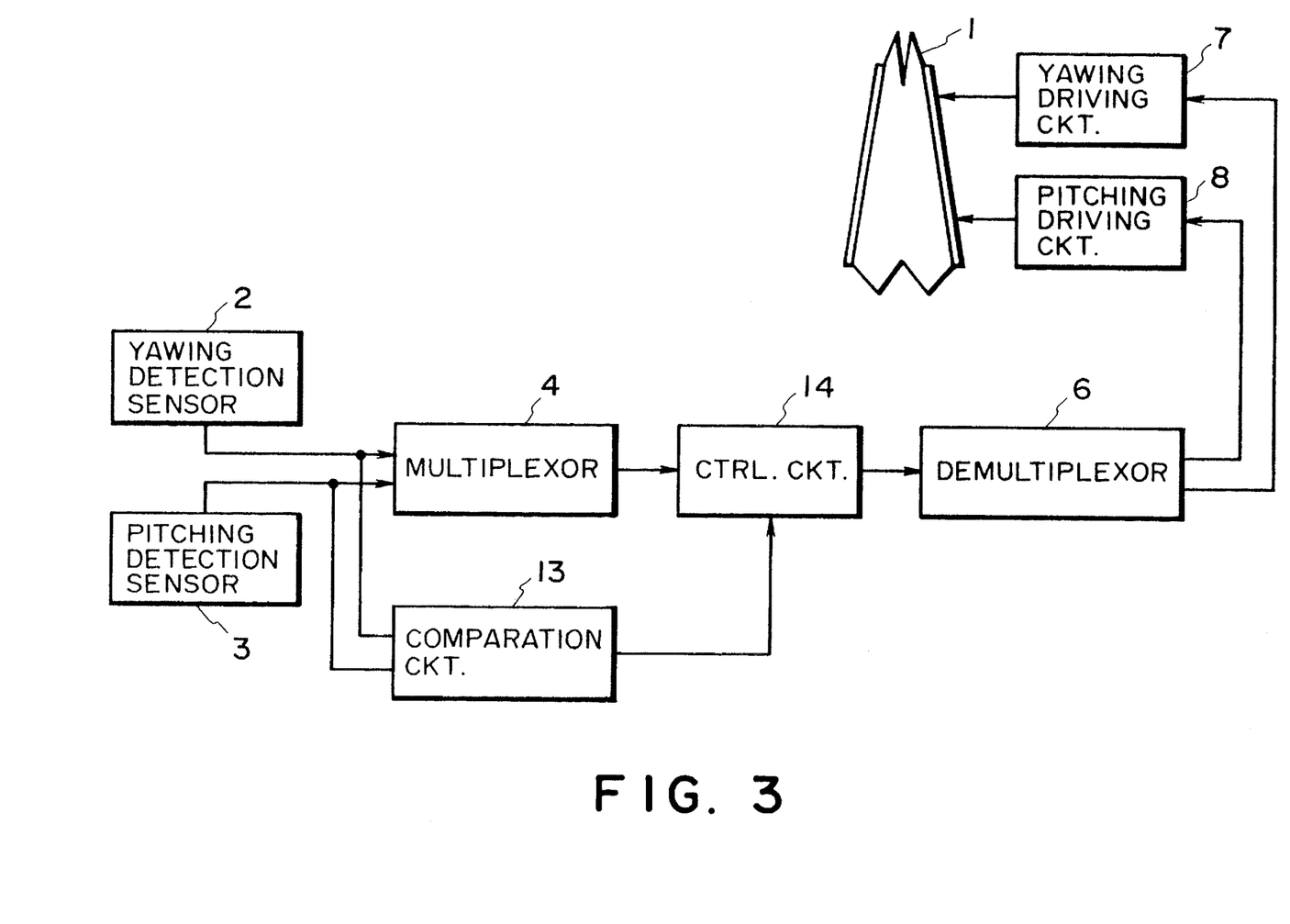
FIG. 3 is a circuit block diagram to show a construction of an image stabilizing apparatus in the third embodiment of the present invention.

FIG. 3 is a circuit block diagram to show a construction of an image stabilizing apparatus in the third embodiment of tile present invention. The same elements are given the same numerals as in FIG. 1.

In FIG. 3, reference numeral 13 designates a comparator, which comprises an absolute value detector to detect an absolute value of an output from each of the yawing and pitching detection sensors 2, 3, and a subtractor to output a difference between the absolute values of the detection sensors 2, 3. Numeral 14 denotes a control circuit, which comprises a switch timing generator, an amplifier, and a phase compensator. The control circuit 14 controls the switching operations of the multiplexor 4 and the demultiplexor 6 in accordance with the output from the comparator 13, and conducts the blur suppression control in time division about the yawing axis and the pitching axis.

An operation of the present embodiment is next explained in order focusing on the difference from the first embodiment.

The comparator 13 has an absolute value detector for each of pitching and yawing to output an absolute value of the output from each of the vibration detection sensors 2, 3.

The subtractor in the comparator 13 outputs a difference between the absolute values obtained by the two absolute value detectors, and outputs for example a positive signal if the absolute value of the output of the yawing detection sensor 2 is greater than the absolute value of the output of the pitching detection sensor 3, and a negative signal otherwise.

If the difference between the absolute values, depending upon the output of the comparator 13, is within a certain narrow range close to zero, the switch timing generator in the control circuit 5 generates a switch timing signal to drive-switch the multiplexor 4 and the demultiplexor 6 at a ratio of time division of 1:1. If the difference is out of the aforementioned narrow range and if the difference is positive, the timing generator generates a switch timing signal to lengthen the control time for yawing suppression about the yawing axis at a stepwise ratio of n:1 depending upon the difference. Conversely, if the difference is negative, the timing generator generates a switch timing signal to lengthen the control time for pitching about the pitching axis at a stepwise ratio of 1:n depending upon the difference.

The first embodiment concerns an example to preliminarily define the ratio of time division. However, an actual photo-taking condition varies depending upon a situation, for example, the pitching is greater in photo-taking while walking or in photo-taking while riding on a moving object, while the yawing is greater in photo-taking in a circumstance in strong horizontal wind. Then, arranging as in the third embodiment, the time division may be carried out with an allocation time longer for the greater instantaneous vibration amount in each of the various photo-taking conditions, so as to improve the total image stabilization effect.

According to tile respective embodiments as described, the apparatus is structured such that the multiplexor is disposed downstream from the pitching and yawing detection sensors, that the demultiplexor is disposed upstream from the pitching and yawing driving circuits, and that the control system disposed therebetween is driven in time division (at an equal time allocation), so that the pitching suppression and the yawing suppression may be carried out by the single control system (amplifier, phase compensator, others), while two control systems were required in the conventional apparatuses.

This permits the number of circuits for the control system to be greatly reduced, thereby reducing the production cost and the dissipation power thereof.

Additionally, by the time-divided drive with allocation of time preliminarily set different from each other, a longer time may be assigned for one of blur suppressions more frequently occurring than the other, whereby the total image stabilizing effect may be improved.

Further, if there is a comparator provided to compare outputs of the pitching and yawing detection sensors and if the allocation of time is changed in real time depending upon the output, the most effective time allocation may be possible according to a vibration condition in various photo-taking conditions. In other words, the total image stabilizing effect may be further improved.

Although tile first to the third embodiments are structured using the analog circuits, it is needless to mention that they can be structured using digital circuits employing a one chip micon as a core element with various digital devices, a DA converter and an AD converter.

As described above, according to the present invention, there is a single set of control means provided for controlling in time division drives of first and second drive means based on respective signals from first and second vibration detecting means, in which the time-divided control is carried out for respective directions for example by first controlling the drive of the first driving means based on the signal from the first vibration detecting means and then controlling tile drive of the second driving means based on the signal from the second vibration detecting means. Thus, the single control means is effective to control the both first and second driving means. Therefore, the present invention is effective to reduce the number of circuits, to decrease the production cost, and to lower the dissipation power.

What is claimed is:

1. An apparatus adapted for use to prevent image blur in a plurality of directions by deflecting a light beam, said apparatus comprising:

a device for sequentially forming signals to prevent image blur in the plurality of directions.

2. An apparatus according to claim 1, wherein said device comprises means for sequentially performing at least a first operation for forming a first signal for blur prevention in a first direction and a second operation for forming a second signal for blur prevention in a second direction.

3. An apparatus according to claim 1, wherein said device comprises means for performing a first operation to form a first signal in accordance with a signal corresponding to image blur in a first direction and a second operation to form a second signal in accordance with a signal corresponding to image blur in a second direction different from the first direction.

4. An apparatus according to claim 1, wherein said device comprises means for sequentially performing a calculation for forming the signals to prevent the image blur in the different directions.

5. An apparatus according to claim 2, wherein said device further comprises varying means for varying a ratio between the time period during which the first operation is performed and the time period during which the second operation is performed.

6. An apparatus according to claim 2, wherein said device further comprises means for outputting the first and second signals to an image blur prevention portion for performing image blur prevention at least in the first and second directions by deflecting a light beam, wherein the first signal is used when the image blur prevention portion performs the image blur prevention in the first direction and the second signal is used when the image blur prevention portion performs the image blur prevention in the second direction.

7. An apparatus according to claim 6, wherein the image blur prevention portion includes a light beam deflection portion for deflecting a transmitted light beam by moving in an optical path.

8. An apparatus according to claim 7, wherein the light beam deflection portion includes a variable apex angle prism.

9. An apparatus according to claim 1, wherein said device comprises means for sequentially forming the signals to prevent the image blur in the different directions in accordance with an output of an image blur detection portion for detecting image blur in the different directions.

10. An apparatus according to claim 9, wherein the image blur detection portion includes means for detecting a vibration of equipment for which the image blur preventing operation is performed using the signals formed by said device.

11. An image blur prevention apparatus comprising:

image blur prevention means for performing image blur prevention in a plurality of directions by deflecting a light beam; and operation means for sequentially forming signals used by said image blur prevention means to perform the image blur prevention in the plurality of directions.

12. An apparatus according to claim 11, wherein said operation means includes means for sequentially performing at least first operation for forming a first signal for blur prevention in a first direction and a second operation for forming a second signal for blur prevention in a second direction.

13. An apparatus according to claim 11, wherein said operation means comprises means for performing a first operation to form a first signal in accordance with a signal corresponding to image blur in a first direction and a second operation to form a second signal in accordance with a signal corresponding to image blur in a second direction different from the first direction.

14. An apparatus according to claim 11, wherein said operation means includes means for sequentially performing a calculation for forming the signals to prevent image blur in the different directions.

15. An apparatus according to claim 12, wherein said operation means further comprises varying means for varying a ratio between the time period during which the first operation is performed and the time period during which the second operation is performed.

16. An apparatus according to claim 12, wherein said image blur prevention means comprises a light beam deflection portion for deflecting a transmitted light beam by moving in an optical path.

17. An apparatus according to claim 16, wherein the light beam deflection portion includes a variable apex angle prism.

18. An apparatus according to claim 11, wherein said operation means comprises means for sequentially forming the signals to prevent image blur in the different directions in accordance with an output of an image blur detection portion for detecting the image blur in the different directions.

19. An apparatus according to claim 18, wherein the image blur detection portion includes means for detecting a vibration of equipment for which the image blur preventing operation is performed using the signals formed by said operation means.

20. An apparatus adapted for use to prevent image blur in a plurality of directions by moving a movable member in accordance with a signal corresponding to a vibration of an equipment for which image blur prevention is performed, said apparatus comprising:

a device for sequentially forming signals, based on the signal corresponding to the vibration, to prevent image blur in the plurality of directions.

21. An apparatus according to claim 20, wherein said device comprises means for sequentially performing at least a first operation for forming a first signal for blur prevention in a first direction and a second operation for forming a second signal for blur prevention in a second directions.

22. An apparatus according to claim 20, wherein said device comprises means for performing a first operation to form a first signal in accordance with a signal corresponding to the vibration of the equipment in a first direction and a second operation to form a second signal in accordance with a signal corresponding to the vibration of the equipment in a second direction different from the first direction.

23. An apparatus according to claim 20, wherein said device comprises means for forming signals cause an image blur prevention portion to perform image blur prevention operations in a plurality of directions, the image blur prevention portion preventing image blur in the plurality of directions by moving a movable member.

24. An apparatus according to claim 23, wherein the image blur prevention portion prevents image blur by moving an optical member.

25. An apparatus according to claim 24, wherein the image blur prevention portion includes a light beam deflection portion for deflecting a light beam.

26. An image blur prevention apparatus, comprising:

image blur prevention means for performing image blur prevention in a plurality of directions by moving a movable member and operation means for sequentially forming signals to prevent image blur in a plurality of directions based on a signal corresponding to a vibration of equipment for which the image blur prevention is performed.

27. An apparatus according to claim 26, wherein said operation means comprises means for sequentially performing at least a first operation for forming a first signal for blur prevention a first direction and a second operation for forming a second signal for blur prevention in a second direction.

28. An apparatus according to claim 26, wherein said operation means comprises means for performing a first operation to form a first signal in accordance with a signal corresponding to the vibration of the equipment in a first direction and a second operation to form a second signal in accordance with a signal corresponding to the vibration of the equipment in a second direction different from the first direction.

29. An apparatus according to claim 26, wherein said operation means comprises means for forming signals to cause an image blur prevention portion to perform image blur prevention operations in a plurality of directions, the image blur prevention portion preventing image blur in the plurality of directions by moving a movable member.

30. An apparatus according to claim 29, wherein the image blur prevention portion prevents image blur moving an optical member.

31. An apparatus according to claim 30, wherein the image blur prevention portion includes a light beam deflection portion for deflecting a light beam.

32. An apparatus according to claim 26, wherein said operation means includes means for forming the signals based on an output of a vibration detection portion for detecting the vibration of the equipment.

33. An apparatus according to claim 32, wherein the vibration detection portion includes a portion for detecting at least the vibration of the equipment in a first direction and the vibration in a second direction different from the first direction.

34. An apparatus according to claim 32, wherein the apparatus includes the vibration detection portion.

35. An apparatus for use with an image blur prevention device that can perform image blur prevention in a plurality of directions by deflecting a light beam, said apparatus comprising:

a control device for causing the image blur prevention device to sequentially perform an operation in a plurality of directions.

36. An apparatus according to claim 35, wherein said control device includes means for causing the image blur prevention device to sequentially perform a first operation for preventing image blur in a first direction and a second operation for preventing image blur in a second direction different from the first direction.

37. An apparatus according to claim 35, wherein the apparatus includes the image blur prevention device.

38. An apparatus for use with an image blur prevention device that can perform image blur prevention in a plurality of directions by moving a movable member in accordance with an output of a vibration detection device for detecting a vibration of equipment for which image blur prevention is performed by the image blur prevention device, said apparatus comprising:

a control device for causing the image blur prevention device to sequentially perform an operation in a plurality of directions.

39. An apparatus according to claim 38, wherein said control device includes means for causing the image blur prevention device to sequentially perform a first operation for preventing image blur in a first direction and a second operation for preventing image blur in a second direction different from the first direction.

40. An apparatus according to claim 38, wherein the vibration detection device includes means for outputting a first signal corresponding to the vibration of the equipment in a first direction and a second signal corresponding to the vibration of the equipment in a second direction different from the first direction, and said control device includes means for causing the image blur prevention device to sequentially perform an operation corresponding to the first signal and an operation corresponding to the second signal.

41. An apparatus according to claim 38, wherein the apparatus includes the image blur prevention device.

42. An apparatus according to claim 38, wherein the apparatus includes the vibration detection device.

* * * * *

UNITED STATES PATENT AND TRADEMARK OFFICE
CERTIFICATE OF CORRECTION

PATENT NO. : 5,483,376  Page 1 of 2
DATED : January 9, 1996
INVENTOR(S) : Tsuneo TAKASHIMA It is certified that error appears in the above-indentified patent and that said Letters Patent is hereby corrected as shown below:

COLUMN 2:

Line 52, "tile" should read --the--.

COLUMN 3:

Line 31, "tile" should read --the--;
    Line 43, "tile" should read --the--; and,
    Line 53, "tile" should read --the--.

COLUMN 4:

Line 56, "tile" should read --the--.

COLUMN 6:

Line 1, "tile" should read --the--; and,
    Line 13, "tile" should read --the--.

UNITED STATES PATENT AND TRADEMARK OFFICE
CERTIFICATE OF CORRECTION

PATENT NO. : 5,483,376
DATED : January 9, 1996
INVENTOR(S) : Tsuneo TAKASHIMA

It is certified that error appears in the above-indentified patent and that said Letters Patent is hereby corrected as shown below:

COLUMN 7:

Line 15, "first" should read --a first--; and,
    Line 65, "directions." should read
--direction.--

COLUMN 8:

Line 7, "cause" should read --to cause--.

Signed and Sealed this

Fourteenth Day of May, 1996

Attest:

BRUCE LEHMAN

*Attesting Officer*      *Commissioner of Patents and Trademarks*